US011633916B2

(12) United States Patent
Missout

(10) Patent No.: US 11,633,916 B2
(45) Date of Patent: Apr. 25, 2023

(54) VERY HIGH TEMPERATURE HOT END FOR FUSED DEPOSITION MODELING PRINTER

(71) Applicant: Kilncore Inc., Sutton (CA)

(72) Inventor: Antoine Missout, Sutton (CA)

(73) Assignee: Kilncore inc., Sutton (CA)

( * ) Notice: Subject to any disclaimer, the term of this patent is extended or adjusted under 35 U.S.C. 154(b) by 0 days.

(21) Appl. No.: 17/296,919

(22) PCT Filed: Nov. 13, 2020

(86) PCT No.: PCT/CA2020/051555
§ 371 (c)(1),
(2) Date: May 25, 2021

(87) PCT Pub. No.: WO2021/113955
PCT Pub. Date: Jun. 17, 2021

(65) Prior Publication Data
US 2022/0314544 A1    Oct. 6, 2022

Related U.S. Application Data

(60) Provisional application No. 62/947,370, filed on Dec. 12, 2019.

(51) Int. Cl.
*B29C 64/295* (2017.01)
*B33Y 30/00* (2015.01)
(Continued)

(52) U.S. Cl.
CPC .......... *B29C 64/295* (2017.08); *B29C 64/209* (2017.08); *B29C 64/321* (2017.08); *B33Y 30/00* (2014.12); *B29C 64/118* (2017.08)

(58) Field of Classification Search
CPC ... B29C 64/295; B29C 64/209; B29C 64/321; B29C 64/118; B33Y 30/00
See application file for complete search history.

(56) References Cited

U.S. PATENT DOCUMENTS

| 5,121,329 A | 6/1992 | Crump |
| 9,022,769 B2 | 5/2015 | Swanson et al. |

(Continued)

FOREIGN PATENT DOCUMENTS

| CN | 102529366 A | 7/2012 |
| CN | 104099675 A | 10/2014 |

(Continued)

OTHER PUBLICATIONS

European Search report, 6 pages, Franz Kreissl, Nov. 29, 2021.

*Primary Examiner* — Joseph S Del Sole
*Assistant Examiner* — Mohamed K Ahmed Ali
(74) *Attorney, Agent, or Firm* — Benoit & Cote, Inc.; Ibrahim Tamer; Mathieu Audet

(57) ABSTRACT

A fused deposition modeling printer comprises a head assembly comprising a heating head. The heating head has a top, a bottom, and a conduit extending between the top and the bottom, wherein the surface of the conduit is adapted to guide a flow of material therein. The heating head comprises an electrically conductive layer along the conduit surface that, when powered, generates heat heating the flow of material traveling in the conduit. One realization uses top and bottom electrical contacts. One realization uses several circumferential electrical contacts to power the heating head.

15 Claims, 12 Drawing Sheets

(51) Int. Cl.
    *B29C 64/321*     (2017.01)
    *B29C 64/209*     (2017.01)
    *B29C 64/118*     (2017.01)

(56) References Cited

U.S. PATENT DOCUMENTS

| | | |
|---|---|---|
| 2008/0213419 A1 | 9/2008 | Skubic et al. |
| 2015/0307385 A1 | 10/2015 | Klein et al. |
| 2016/0194233 A1 | 7/2016 | Van Pelt |
| 2017/0291841 A1 | 10/2017 | Inamura et al. |
| 2018/0229433 A1 | 8/2018 | Lan |
| 2019/0022961 A1 | 1/2019 | Mourou et al. |
| 2020/0298479 A1* | 9/2020 | Sweeney ................ B33Y 70/10 |
| 2021/0086446 A1* | 3/2021 | Bruggeman ............ B29C 64/20 |
| 2021/0178670 A1* | 6/2021 | Denbeaux ............ B29C 64/165 |
| 2022/0072765 A1* | 3/2022 | Klimczak ............ B29C 64/209 |

FOREIGN PATENT DOCUMENTS

| | | |
|---|---|---|
| CN | 105538715 A | 5/2016 |
| CN | 105984142 A | 10/2016 |
| CN | 106313501 A | 1/2017 |
| CN | 206106378 U | 4/2017 |
| CN | 107225753 A | 10/2017 |
| CN | 105773979 | 5/2018 |
| CN | 108356270 A | 8/2018 |
| CN | 208896509 | 5/2019 |
| CN | 110127992 A | 8/2019 |
| CN | 110421850 A | 11/2019 |
| WO | 2018026909 A1 | 2/2018 |

\* cited by examiner

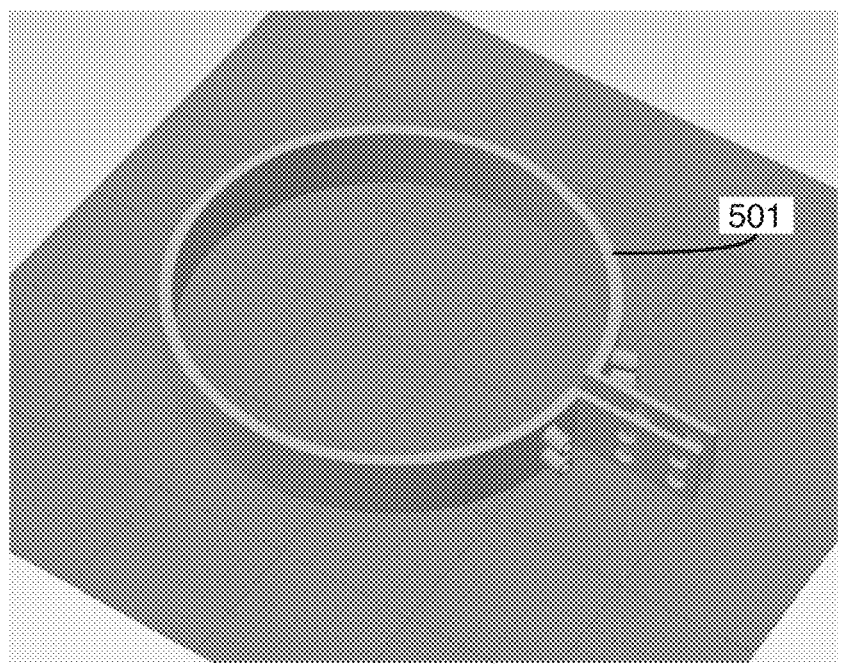
FIGURE 10
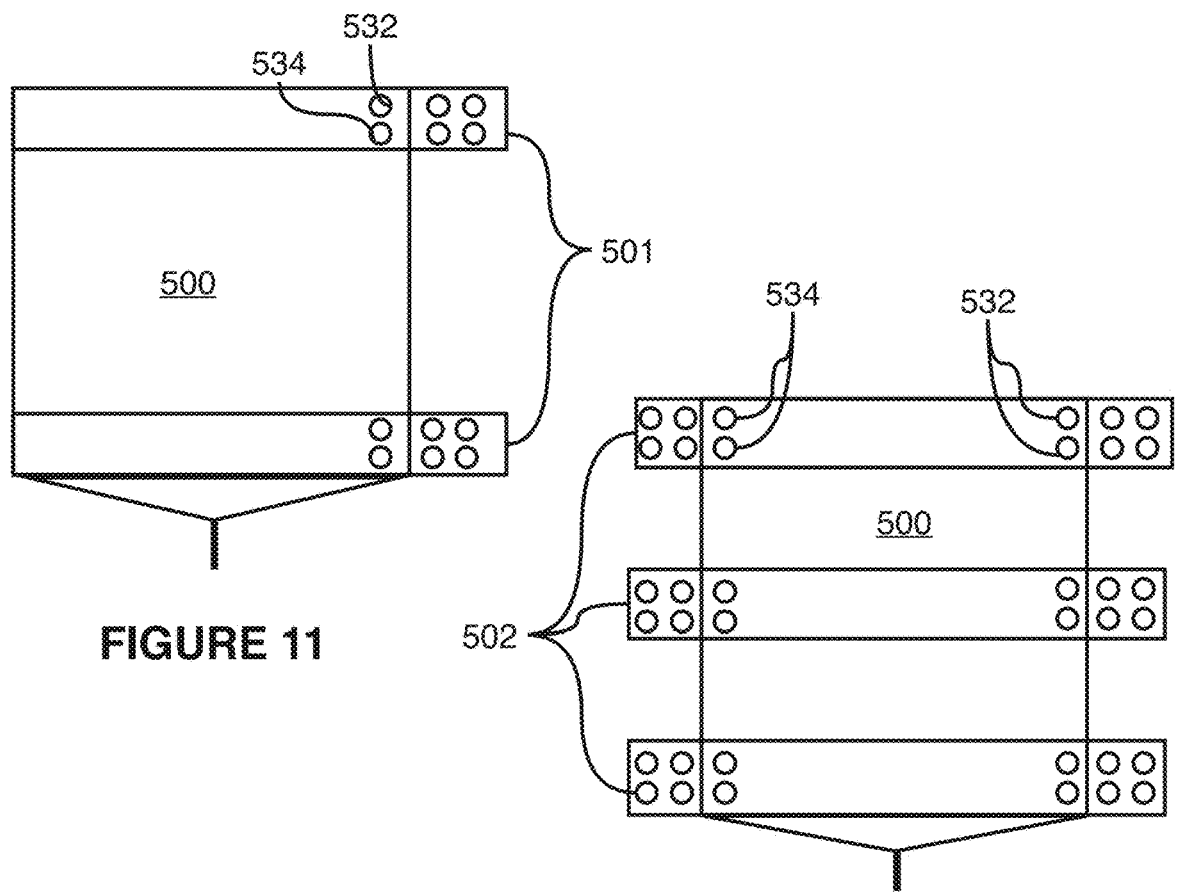
FIGURE 11
FIGURE 12

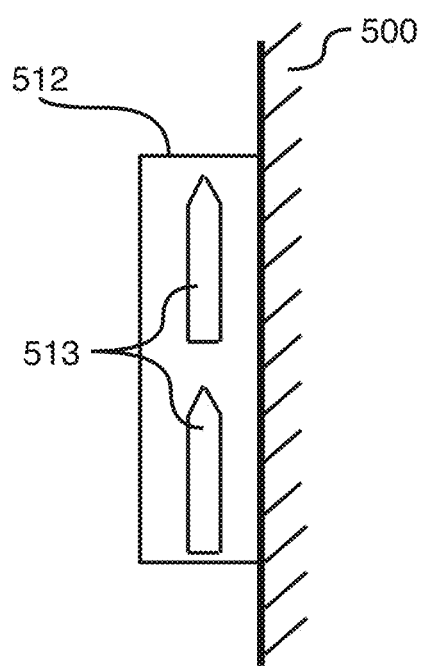
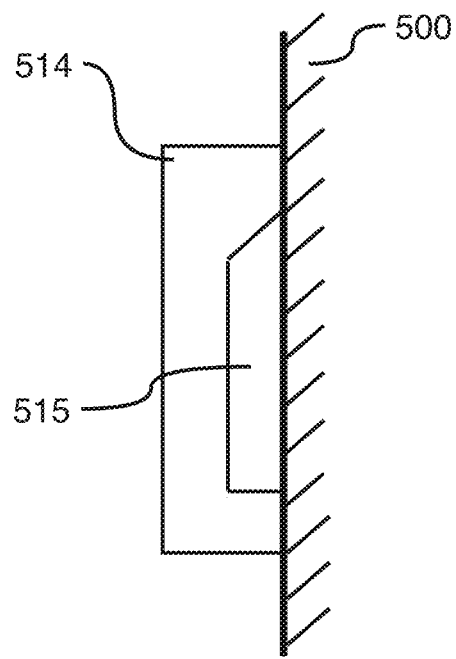
FIGURE 13
FIGURE 14

VERY HIGH TEMPERATURE HOT END FOR FUSED DEPOSITION MODELING PRINTER

CROSS-REFERENCE TO RELATED APPLICATION

This application claims priority from U.S. provisional patent application 62/947,370 filed Dec. 12, 2019, the specification of which is hereby incorporated herein by reference in its entirety.

BACKGROUND

(a) Field

The subject matter disclosed generally relates to fused deposition modeling printers, aka 3D printers, and tools adapted to perform additive manufacturing processes through the deposition of additive materials. More particularly, the subject matter disclosed relates to heating components of additive manufacturing devices.

(b) Related Prior Art

Existing conventional fused deposition modeling printers are specialized pieces of equipment that are making their way into the mainstream market. It is currently possible to buy parts to build your own 3D machine, which requires time and knowledge. On the other hand, one can also buy an assembled 3D printing machine that is ready to use. In both cases, to build and assemble or repair the 3D printing machine, multiple mechanical parts have to be bought from multiple companies, which increases the cost, complexity, and time required for assembling a 3D printing machine while decreases the desire of owners of 3D printing machines to maintain spare parts to respond to wear and tear.

One supplier, www.RepRap.org, has tried to overcome these shortcomings by designing a general-purpose self-replicating 3D printing machine. However, since the RepRap fused deposition modeling printers is only capable of producing plastic-made parts, the opportunities provided by the RepRap machine are relatively limited.

Furthermore, fused deposition modeling printers are nowadays being actively developed by many other companies and individuals with the object of either trying to make an ever-cheaper fused deposition modeling printers or a more reliable plastic filament printer, which has a major drawback in the cost of the printing material: plastic beads for fused deposition modeling printers are expensive, at least about 30 $/kg. Alternatively, others develop 3D metal printers with which people shine lasers at expensive metals. Another alternative is using resin as printing material, which, like plastic beads, is also expensive.

Accordingly, the present subject-matter aims to at least partly address these shortcomings.

More broadly, there are increasing needs for printing 3D objects made of high and very high melting temperature materials, and the present subject-matter aims to at least partially address these needs in an improved manner in comparison with existing tools.

SUMMARY

According to an embodiment, there is provided a head assembly for a fused deposition modeling printer comprising: a heating head comprising: a top; a bottom; a conduit extending between the top and the bottom having a conduit surface for guiding a flow of material therein; and an electrically conductive layer providing a resistance along the conduit surface for generating heat when electric current flows within the electrically conductive layer.

According to an aspect, the electrically conductive layer is made of a combination of ceramic powder and of metallic powder.

According to an aspect, the electrically conductive layer extends from the top to the bottom of the heating head.

According to an aspect, the electrically conductive layer has a first thickness at a first circumference being at a first distance from the top and second thickness at a second circumference being at a second distance farther from the top of the heating head than the first circumference.

According to an aspect, temperature generated at the second circumference is greater than temperature generated at the first circumference.

According to an aspect, the heating head comprises an electrically insulating layer distant from the conduit surface.

According to an aspect, the electrically conductive layer has a minimum thickness of between 1 and 10 mm.

According to an aspect, the electrically conductive layer extends over the conduit surface in its entirety.

According to an aspect, the electrically conductive layer extends over at least a portion of at least one of the top and the bottom of the heating head.

According to an aspect, the head assembly further comprises: a top electric connector connecting the electrically conductive layer at or near the top of the heating head; a bottom electric connector connecting the electrically conductive layer at or near the bottom of the heating head; and a biasing component pushing at least one of: the top electric connector toward electrically conductive layer; and the bottom electric connector toward the electrically conductive layer.

According to an aspect, one of the top electric connector and the bottom electric connector has a toric surface.

According to an embodiment, there is provided a head assembly for a fused deposition modeling printer comprising: a heating head comprising: a conduit having a conduit surface guiding a flow of material therein; a plurality of flanges extending outwardly from the conduit each having a circumference surface; and an electrically conductive trace extending between a first one of the circumference surfaces at first one of the plurality of flanges and a second one of the circumference surfaces at second one of the plurality of flanges via a portion of the conduit surface; and electrically powered inwardly pressing tightening rings, wherein the tightening rings are mounted to the first one and the second one of the circumference surfaces thereby defining an electric circuit therebetween via the conduit surface.

According to an aspect, heating head comprises a top, a bottom, and wherein the conduit extends between the top and the bottom.

According to an aspect, the flanges have distinct heights according to distinct distances from the top of the heating head.

According to an aspect, the flanges and the conduit have respectively a flange thickness and a conduit thickness, and wherein the electrically conductive trace extends over one of the flange thickness in its entirety and the conduit thickness in its entirety.

According to an aspect, the flanges and the conduit have respectively a flange thickness and a conduit thickness, and wherein the electrically conductive trace extends over a portion of the conduit thickness extending from the conduit surface.

According to an aspect, number of flanges is three (3) or more.

According to an aspect, the electrically conductive trace comprises an electrically conductive layer made of a combination of ceramic powder and of metallic powder.

According to an aspect, the conduit comprises an electrically insulating layer, wherein the electrically insulating layer is farther from the conduit surface than the electrically conductive layer.

According to an aspect, one of the tightening rings comprises one of a conduit and a recess providing passage for a cooling fluid.

According to an aspect, the conduit comprises a section delimited by a pair of boundary flanges, wherein control of power transmitted over to the pair of boundary flanges determines heat generated by the conduit surface in the section.

According to an aspect, temperature generated over the conduit surface is higher than temperature generated over the circumference surface.

According to an aspect, the head assembly further comprises insulating material extending between two neighbor ones of the flanges.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 10 is a perspective view of an exemplary tightening ring;

FIGS. 11 and 12 are fronts view of head assemblies in accordance with embodiments using respectively single piece tightening rings and two-piece tightening rings;

FIGS. 13 and 14 are cross-section views of portions of head assemblies in accordance with embodiments wherein a portion of a heating head and of a tightening ring are depicted;

It will be noted that throughout the appended drawings, like features are identified by like reference numerals.

DETAILED DESCRIPTION

Figure 1:
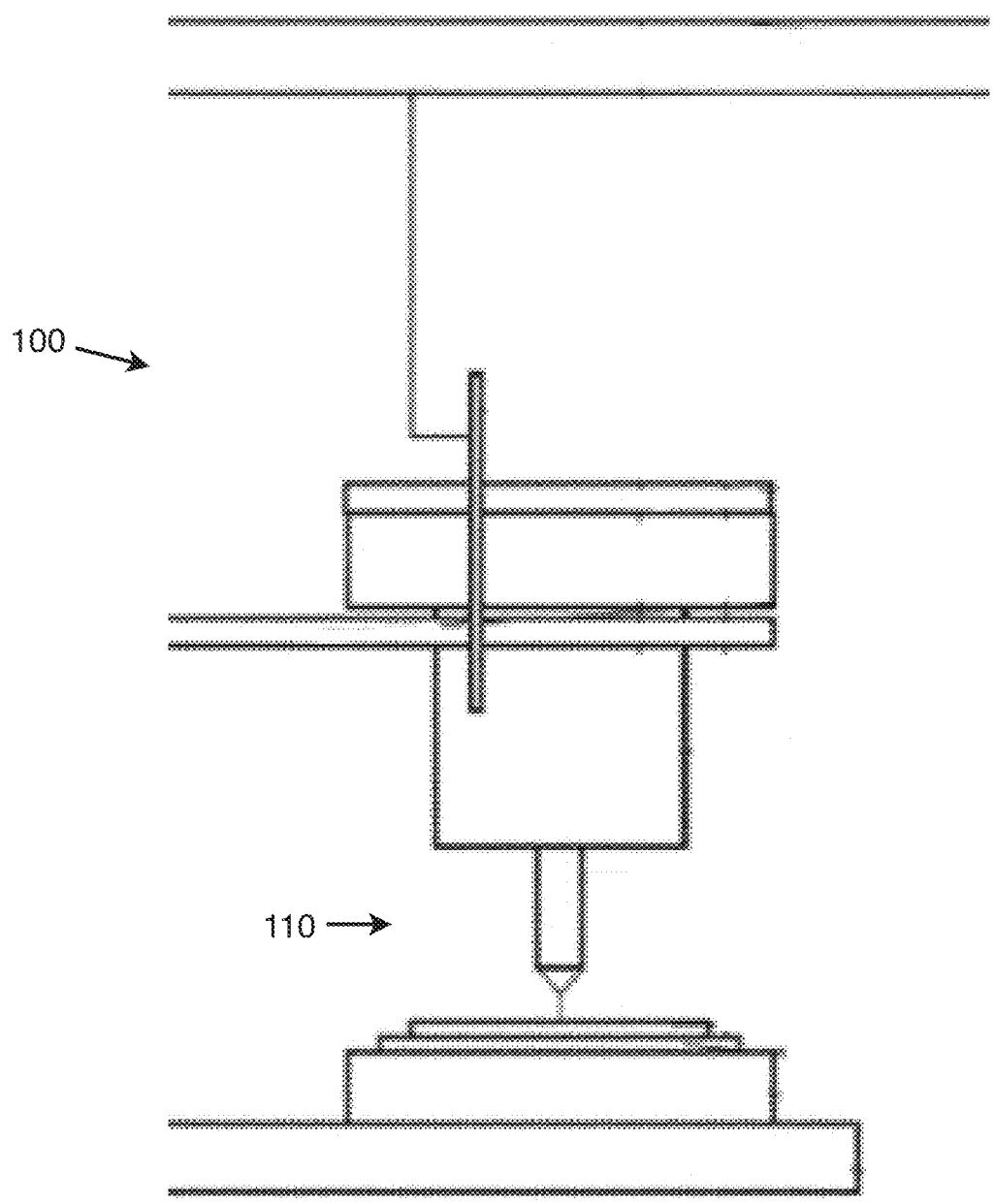
FIG. 1 is a schematic of a fused deposition modeling printer in accordance with an embodiment.

Nowadays, recycled glass is a widely available and low-cost material. So, in light of the text by John Klein from MIT: http://web.media.mit.edu/~neri/MATTER.MEDIA/Theses/John_Klein_MIT_MSc_Thesis_Submission%20(1).pdf, it becomes apparent that there is an opportunity to decrease the cost of operating a fused deposition modeling printers by both designing a fused deposition modeling printers capable of manufacturing their own replacement parts; and being able to use a variety of printing materials, including recycled glass material which is widely available at low costs.

Recycled glass is basically considered garbage these days; recycled glass is currently sold for instance as abrasive, pool filter material, or additive/ingredient for concrete products. Recycled glass can currently be bought in bulk, with a fixed granule size, for less than 0.50 $/kg, and in some cases at even lower prices considering that some cities are spending money to get rid of their recycled glass rather than selling it.

Furthermore, with the explosion of fields in which are considered this type of manufacturing of particular parts, the needs in solution to print parts in a variety of materials, including very high temperature melting material increases.

Accordingly, the fused deposition modeling printers, aka 3D printers or Additive Manufacturing Devices (AMDs), described herein takes advantage of the present situation by being able of using widely available recycled glass as a printing material as other high melting temperature material and even very high melting temperature materials. Nevertheless, alternative printing materials are considered with respect to the fused deposition modeling printers of the subject-matter, such as a variety of materials available in powder or granule formats. Using one such alternative printing material is intended to require simple adjustments to the fused deposition modeling printer described herein. Alternative printing material suitable for the present fused deposition modeling printers comprises sugar, PLA granules, ABS granules, PETG granules, metal, sand, Martian regolith, etc.

With respect to the present description, references to "fused deposition modeling printer" should be understood to refer to a tool or device adapted to perform additive manufacturing processes through deposition of additive materials. Accordingly, the expression "fused deposition modeling printer" encompasses any device or subsystem of a tool adapted to perform such a process, regardless of the nature of the outcome of the process.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal installation of the product.

One solution to have a fused deposition modeling printer being able to operate with high melting temperature material is described in patent application PCT/CA2019/050861 called SELF-REPLICATING FUSED DEPOSITION MODELING PRINTER USING GRANULES and filed by the Applicant of the present patent application.

One found solution to reach high and very high temperatures consists in having a head or nozzle operating also as a crucible to both guide material to be deposited in and out of the fused deposition modeling printer 100 but also to heat the material to very high temperatures without providing a path and thus time for the material to cool down.

Referring to FIGS. 1 to 5, a head assembly 110 can reach higher temperatures than those from the prior art. The head assembly 110 comprises a new design heating head 120, a material guide tube 130, a conductive inner tube 140, and a conductive outer tube 150.

Figure 3:
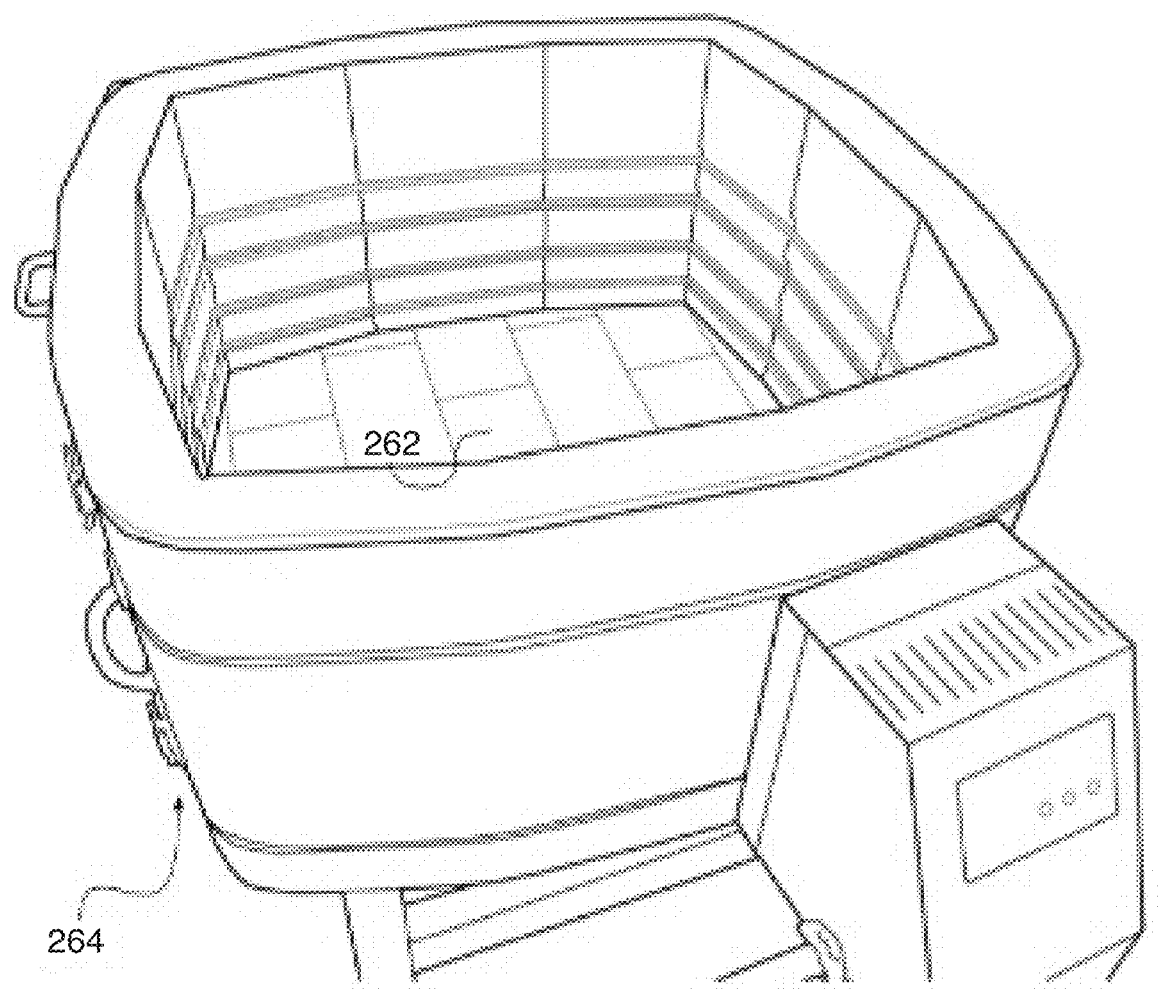
FIG. 3 is a perspective view of a heated chamber according to an embodiment used in relation to the fused deposition modeling printer according to an embodiment.

According to a realization, the fused deposition modeling printer 100 is operating in cooperation with, or comprises, a heated chamber 264 comprising a kiln assembly 262 as depicted on FIG. 3.

Figure 4:
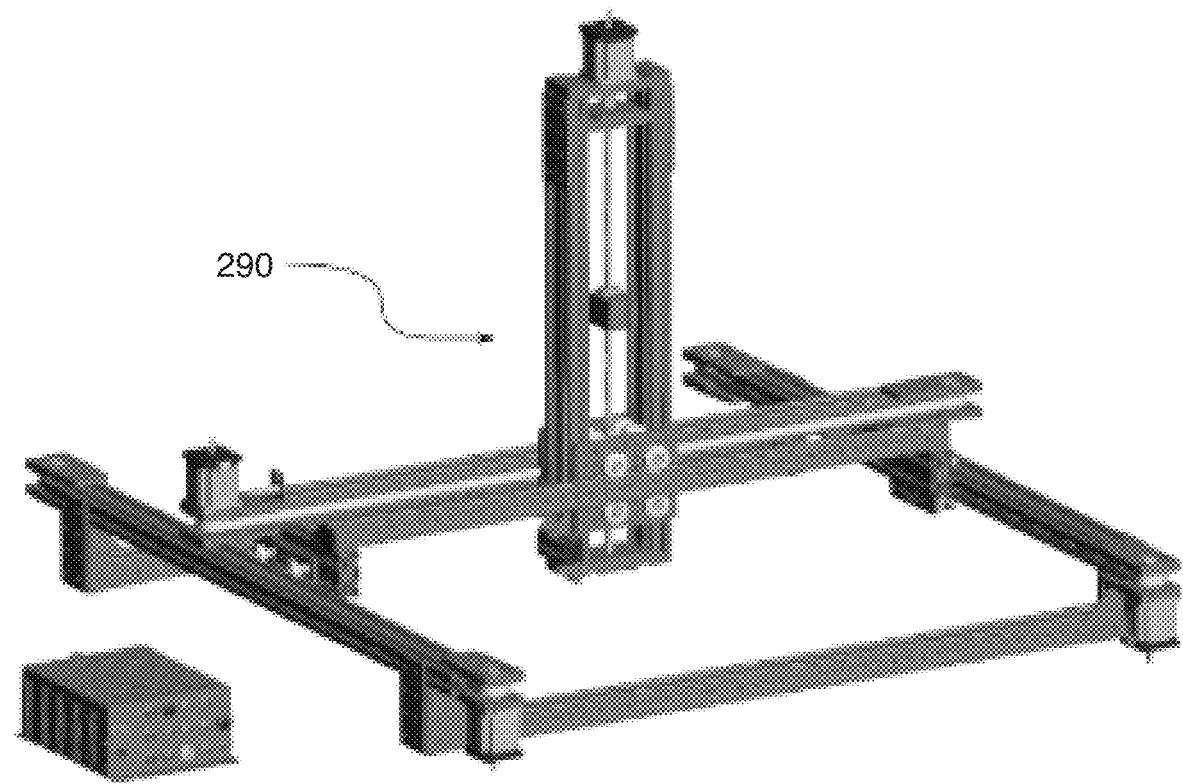
FIG. 4 is a perspective view of a Computer Numerical Control (CNC) machine part of the fused deposition modeling printer according to an embodiment.

Further, the fused deposition modeling printer 100 may operate using a Computer Numerical Control (CNC) machine 290 as depicted on FIG. 4 to continually guide the position of the head assembly 110 during the printing process.

Figure 5:
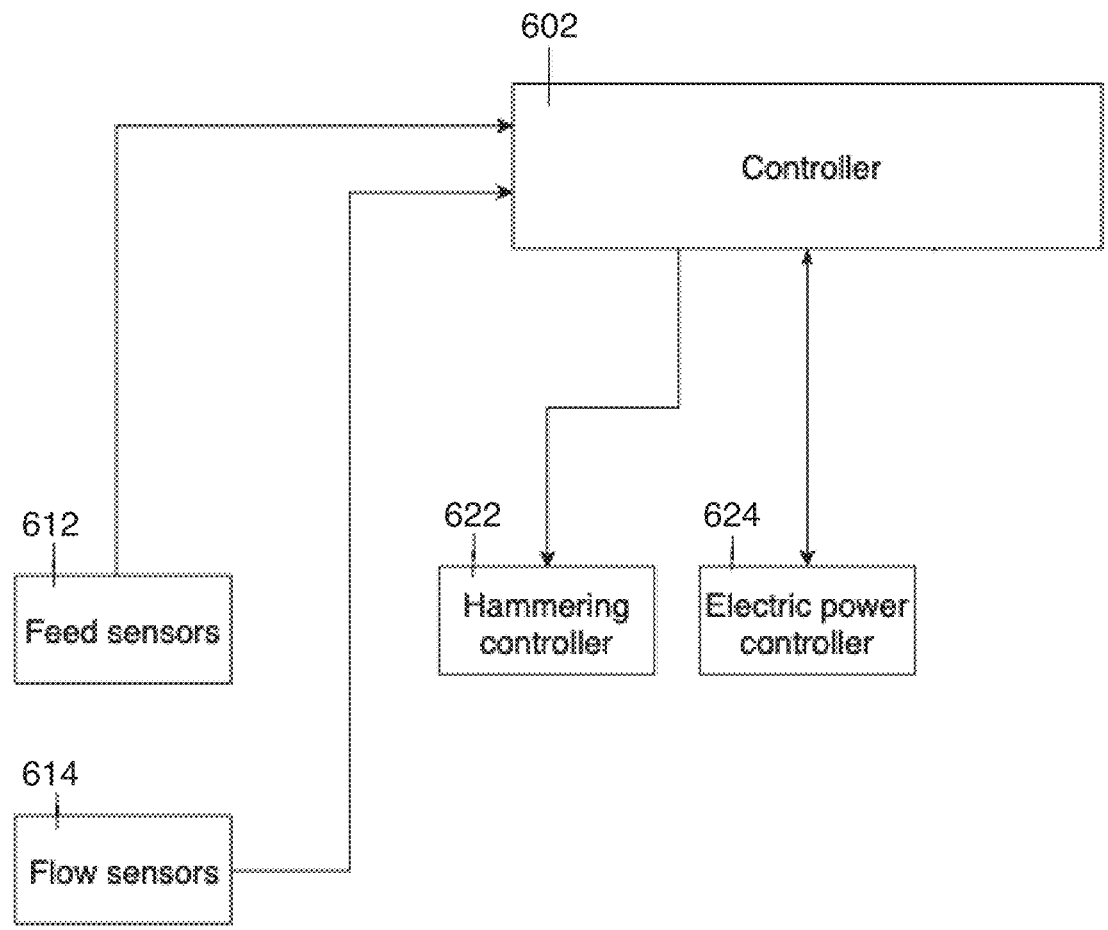
FIG. 5 is a schematic of controlling components of an embodiment of a fused deposition modeling printer.

Referring to FIG. 5, the fused deposition modeling printer 100 operates under the control of a controller 602 connected to sensors (e.g., feed sensor 612 and flow sensor 614) and operating components (e.g., hammering controller (not depicted), CNC controller 622 and electrical power controller 624) to control all parameters of operation (e.g., temperature, the flow of material, other controllable characteristics of the material such as pressure, controllable electrical parameters, controllable tool parameters, nozzle position, etc.) of the fused deposition modeling printer 100 during its operation.

Figure 2:
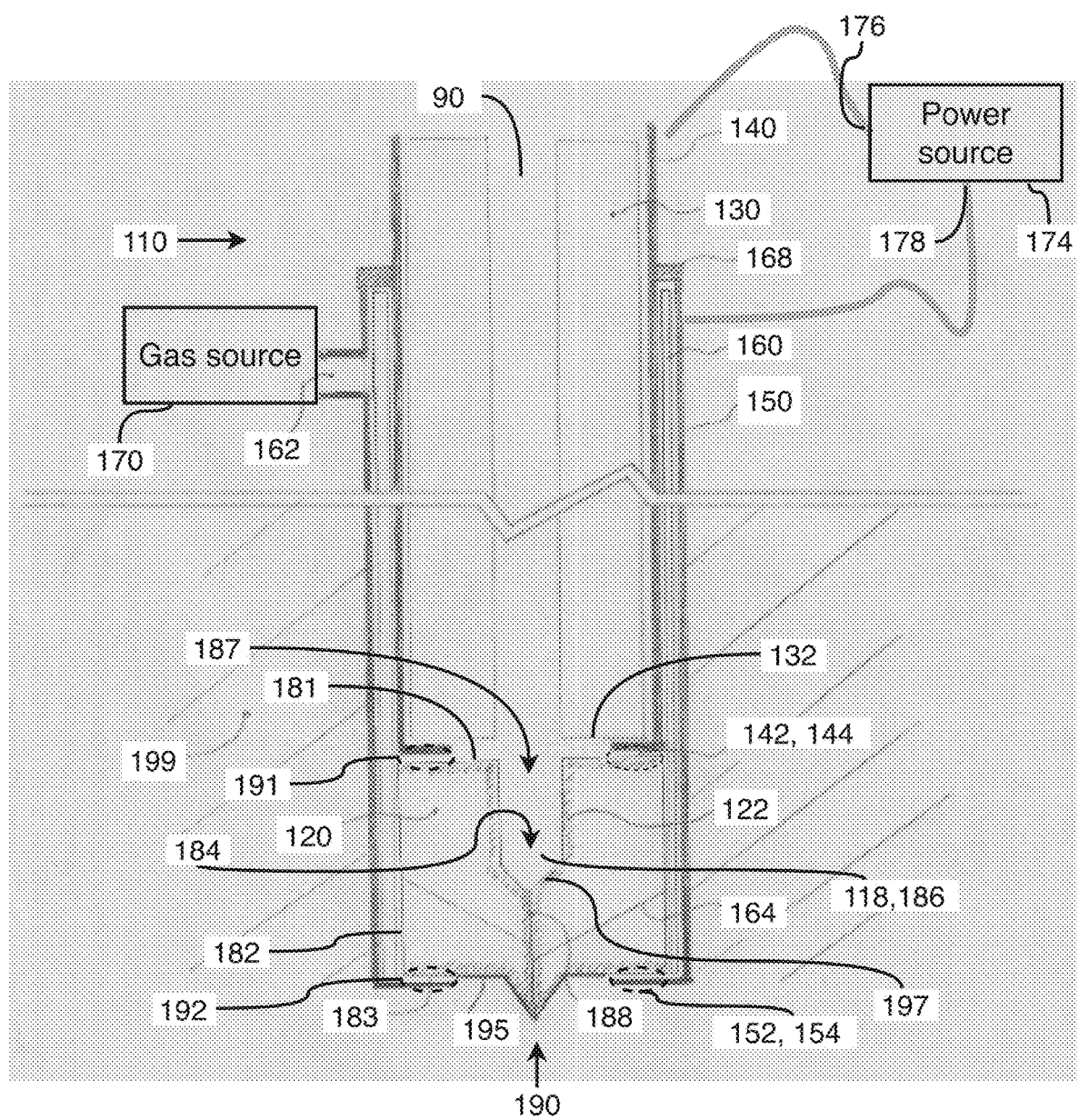
FIG. 2 is a schematic of a partial sectional side view of a head assembly of a fused deposition modeling printer of the present application in accordance with an embodiment.

Referring back particularly to the head assembly 110 of FIG. 2, the new design head assembly 110 comprises a heating head 120. The heating head 120, operating in part as a nozzle, is made of a mix/composite of ceramic material and metallic material to define a cermet layer 122 (aka an electrically conductive layer or electrically conductive trace) that forms an external layer about part of its conduit surface 197 and external faces.

The heating head 120 is realized through the forming of ceramic powder under pressure in the desired shape, with the ceramic powder being mixed with metallic powder to generate the cermet layer 122.

The cermet layer 122, through the presence of the metallic powder, defines an electric circuit that is electrically conductive and that provides a resistance (hence heat) when an electric current passes through the cermet layer 122 while providing an insulating layer elsewhere.

The heating head 120 has a typical nozzle shape: a generally cylindrical shape having a top 181, an outer face 182, a bottom 183, and a conduit 184 passing through the heating head 120 from the top 181 to the bottom 183. The conduit 184 is shaped like a funnel and is divided into two portions: a feeding conduit 186 and a nozzle conduit 188. The conduit 184 is adapted to heat and guide the material 90 to be deposited to the nozzle end 190, wherein the passage area of the conduit 186 decreases from the upstream end 187 of the feeding conduit 186 to the nozzle end 190 that is the downstream end of the nozzle conduit 188.

The cermet layer 122 is located about the interior conduit surface 197 facing the feeding conduit 186 where it heats the material 90 to or above its melting point and about the nozzle conduit 188 where it heats more or maintains the material 90 at the desired temperature, as on the top 181 and on the bottom 183 of the heating head 120.

The cermet layer 122 forms a continuous layer from the top 181, the conduit 184, and the bottom 183 thereby allowing the top 181 and the bottom 183 to operate as electrical contacts (first electrical contact 191 and second electrical contact 192) connected to a power source 174 (schematically depicted).

It should be noted that the conduit surface 197 has a plurality of distinct circumferences as can be witnessed when considering different heights in reference to the top of the heating head 120. More precisely, the circumference decreases between the upstream end 187 and the nozzle end 190. The heating heat 120 is designed to generate more heat about the nozzle end 190 than the upstream end 187 since the cross area of the electrically conductive layer is greater at the latter than the former.

According to a realization, the heating head 120 is manufactured using hot pressing and sintering of carefully prepared powders, such that the top 181, bottom 183, and areas close to the raw material (conduit surface 197) have conducting or semi-conducting characteristics while other parts of the heating head 120 far from electrical contacts or from the material 90 are electrically insulating, aka acting as an electrically insulating layer. This is achieved by using different powders in the pressing mold (thus having the heating head 120 being electrically conducting on the bottom, the top and/or about the conduit and being insulating elsewhere) and by post-processing the heating head 120 as needed with a machining process, e.g., physically removing material, to attain the final shape, and specifically the funnel shape of the conduit 184. According to a realization, the machining process is particularly applied to the nozzle conduit 188 to obtain the desired size and shape.

According to realizations, the heating head 120 is manufactured using powder metallurgy, ceramics and/or ceramic metals, with the exact composition of the conducting or semi-conducting parts and of the insulating parts depending on the desired temperature and chemical compatibility with the material 90 to be used by the fused deposition modeling printer 100.

According to a realization, a coating (not depicted) can be applied over portions of the heating head 120, and particularly over the surface that contacts the material 90.

According to a realization, the heating head 120 has a diameter of 50~300 mm and an inner diameter varying from about 20~50 mm at its top about the feeding conduit 186 to about 0.1~10 mm about the nozzle end 190. The cermet layer 122 has typically a thickness of about 1~10 mm about the contact end 142, a thickness of about 1~10 mm about the contact end 152, and a thickness of about 1~10 mm about the nozzle conduit 188, and more particularly about the nozzle end 190. Thus, the electrically conductive cermet layer 122 has a first thickness at a first circumference being at a first distance from the top and second thickness at a second circumference being at a second distance farther from the top of the heating 120 head than the first circumference.

It should be noted that the temperature of the portion of the electrically conductive cermet layer 122 is controlled by controlling the electrical current passing through the portion of the cermet layer and the scale of the area through which the electric current must pass. Thus, a thicker portion of the cermet layer 122 may result in a higher temperature if the electrically conductive cross-area of the thinner layer is greater.

According to a realization, the heating head 120 comprises on the exterior surface, and more particularly on the bottom 183 a glazing 195 that can block the flow of molten material 90 in case the heating head 120 is too porous, which can be an issue in some conditions. It should be understood that the glazing 195 is applied at desired locations, for example, the bottom 183, to prevent undesired outcomes without hindering the normal operations of the heating head 120. Therefore, the glazing 195 is applied such that it does not interfere with the nozzle end 190 and with the electrical contact between the heating head 120 and the conductive inner and outer tubes 140, 150.

It should further be noted that a portion of the heating head 120, and more precisely the conduit portion of the cermet layer 122 has a generally funnel shape. This geometry results in most of the heat generated and top temperatures are about the nozzle conduit 188 since the nozzle conduit 188 provides the smallest area for the electric current to travel through. Since high heat is generated around the smallest radius, the maximum temperature is witnessed at that location and falls as the radius considered for the electric current to travel through increases. The radiuses of the lips 144, 154 and the material of the conductive inner and outer tubes 140, 150 are selected to obtain a temperature at the electrical contacts when in operation at a maximum operating temperature that can be tolerated without difficulty by the conductive inner and outer tubes 140, 150 for acceptable periods of operation.

It should further be noted from the previous teaching of the characteristics of the heating head 120 that the conductive inner and outer tubes 140, 150 can be made with less expensive materials than the heating head 120. To control the acceptable material to manufacture them, one must determine the characteristics of the head assembly 110 to be adapted to a heating temperature, a material flow rate, a contact top temperature, etc. Therefore, one designer will succeed to decrease the costs of manufacture of the head assembly 110 through a mix of manufacturing materials well adapted to the specific parameters undergone by each of the components of the head assembly 110.

Back to the components of the head assembly 110, the conductive inner tube 140 consists of a cylindrical tube adapted to be electrically charged and in contact with the first electrical contact 191 of the heating head 120. The conductive inner tube 140 comprises a contact end 142 shaped as an inward lip 144 extending inwardly on top of the top 181 of the heating head 120.

The tube shape of the conductive inner tube 140 allows the conductive inner tube 140 to house the material guide tube 130 therein, with the lip 144 being located in-between the top 181 of the heating head 120 and the bottom 132 of the guide tube 130.

To provide the desired quality of electrical contact between the conductive inner tube 140 and the heating head 120, a pressure is typically applied over the guide tube 130 during the operation of the fused deposition modeling printer 100, thereby compressing the lip 144 in-between them and ensuring that no material 90 may flow out of its normal path through the space between the guide tube 130 and the heating head 120.

According to a realization, the conductive inner tube 140 is a metal tube with an increased surface area at the bottom to provide good electrical contact.

According to a realization, the head assembly 110 does not comprise a guide tube 130, with the contact between the conductive inner tube 140 and the heating head 120 being operated directly on the conductive inner tube 140 or through another component attached or pressed against the conductive inner tube 140. According to this realization, the raw material 90 (e.g., granules or filament) is guided through a conduit of a greater diameter. With this realization, the conductive inner tube 140 is made or coated with a material suitable for the target temperature (ceramic, alumina, refractory material, etc.).

The conductive outer tube 150 consists in a generally cylindrical tube adapted to be electrically conductive and in contact with the second electrical contact 192 of the heating head 120. The conductive outer tube 150 comprises a contact end 152 shaped as an inward lip 154 extending inwardly below the bottom 183 of the heating head 120. Accordingly, the contact ends 191 and 192, aka respectively the top and bottom electric connectors, have a toric surface optimizing electricity connection.

The tube shape of the conductive outer tube 150 allows the conductive outer tube 150 to house the heating head 120, the guide tube 130 and the conductive inner tube 140.

According to a realization, the conductive outer tube 150 further houses an electric insulator 160 separating and electrically insulating the conductive inner tube 140 from the conductive outer tube 150.

The conductive outer tube 150 is adapted to form a general housing of the head assembly 110, wherein pressure upward on the conductive outer tube 150 and pressure is applied downwardly over the material guide tube 130 to ensure the electrical contacts for other reasons discussed before. The cermet layer 122 is shown to define an electrical connection between the conductive inner tube 140 and the conductive outer tube 150.

According to a realization, the conductive outer tube 150 is a metal tube with an increased surface area at the bottom for better electrical contact.

According to a realization, biasing components (not depicted) such as a spring assembly is mounted to directly or indirectly connect the conductive outer tube 150 with the guide tube 130 for a constant or almost constant pressure to be applied to the head assembly 110 regardless of the pressure applied by the material 90 flowing in the conduit 184 during the operation of the fused deposition modeling printer 100.

According to other realizations, a pressure between the conductive outer tube 150 with the guide tube 130 is provided continuously, for example using clamps (not depicted), or using other solution such as having one structurally immobile component and applying pressure on the other to relatively push the components against each other.

According to a realization, the conductive outer tube 150 comprises a gas inlet 162 to which is connected a gas source 170 (schematically depicted on FIG. 2) for controlling the gas pressure between the gas inlet 162 and the heating head 120 (e.g., controlling an increase or a reduction of the gas pressure). According to realizations, the heating head comprises gas conduits 164 through which gas and gas pressure are communicated to the conduit 184, and more precisely the nozzle conduit 188. According to realizations, the gas conduits 164 comprise slits, micro-slits, openings, micro-openings, or porosity allowing variation of gas pressure and gas flow to be coupled to the material 90.

When the conductive outer tube 150 comprises a gas inlet 162, the head assembly 110 comprises a seal 168 to seal the gap located between the conductive inner tube 140 and the conductive outer tube 150 against a gas leak. The seal 168 further operates as (e.g., made of or coated with) an electrical insulator, since made of or coated with an electrical insulator material, to prevent electricity to pass between the conductive inner and outer tubes 140, 150 therethrough.

According to realizations comprising a gas inlet 162 and insulator 160, the insulator 160 is adapted either to leave space for gas to travel around the insulator 160, that the insulator 160 comprises conduits or openings for the gas to travel between the top portion and the bottom portion of the insulator 160, or that the insulator 160 is made of porous material allowing the gas to travel from top to bottom.

According to a realization, thermal insulation 199 surrounds the conductive outer tube 150 to prevent undesired contact of the hot conductive outer tube 150 for thermal and electrical considerations.

It should be understood that the operation of the fused deposition modeling printer 100 involves a power source 174 comprising two poles or contact terminals 176 and 178 to which the conductive inner and outer tubes 140, 150 are connected directly or indirectly. The control of the power source 174 controls the current passing through the heating head 120 and thus the temperatures of the wall of the conduit 118.

Further, since the electric power source 174 is of a known voltage, a current sensor which, according to realizations, is either part of or distinct from the power source 174. In the depicted realization, the current sensor is part of the power source 174 of FIG. 2.

According to a realization, the current sensor can be used to measure the resistivity of the head assembly 110 and indirectly the temperature of the conduit 118 of the heating head 120. Accordingly, an electrical power controller and a flow sensor can define a feedback temperature control system operative with the present head assembly 110.

Sensing components such as those using Kelvin sensing, see reference https://en.wikipedia.orq/wiki/Four-terminal_sensing, (depicted on FIG. 8 in relation with another realization) use a plurality of wires 458 contacting the heating head 120 or other components of the head assembly 110 (e.g., electrical contact points) may be used to collect information and to control the operation of the fused deposition modeling printer 100 without departing from the present teaching. The determination of the best locations for one or more Kelvin sensing devices is a question of the limitations of the components to allow passage of the wires and of the useful nature of the collected data at these locations.

It should further be noted that the described head assembly 110 provides for an easy change of the heating head 120 while keeping the same conductive inner and outer tubes 140, 150. It also makes it easy to produce a heating head 120 using a variety of powders. During the manufacturing, the proper placement of the different powders in the mold can be either done meticulously by hand or automated. Such a manufactured heating head 120 can thus provide superior performances and can reach higher top temperatures than known technologies.

Referring to FIGS. 6 to 9, another realization able to reach high temperatures comprises a conductive double-funnel shaped heating head, aka crucible/nozzle combination. Such a fused deposition modeling printer 100 comprises a feeding, heating and deposition assembly comprising a feeding tube 450 (i.e., a material feeding conduit, depicted on FIG. 9) comprising an inner tube 460 fed at the top extremity with material and connected to a heating head 420, aka crucible/nozzle combination (C/NC), at the bottom extremity. The feeding tube 450 further comprises an outer tube 480 also connected to the heating head 420 at its bottom extremity.

Figure 6:
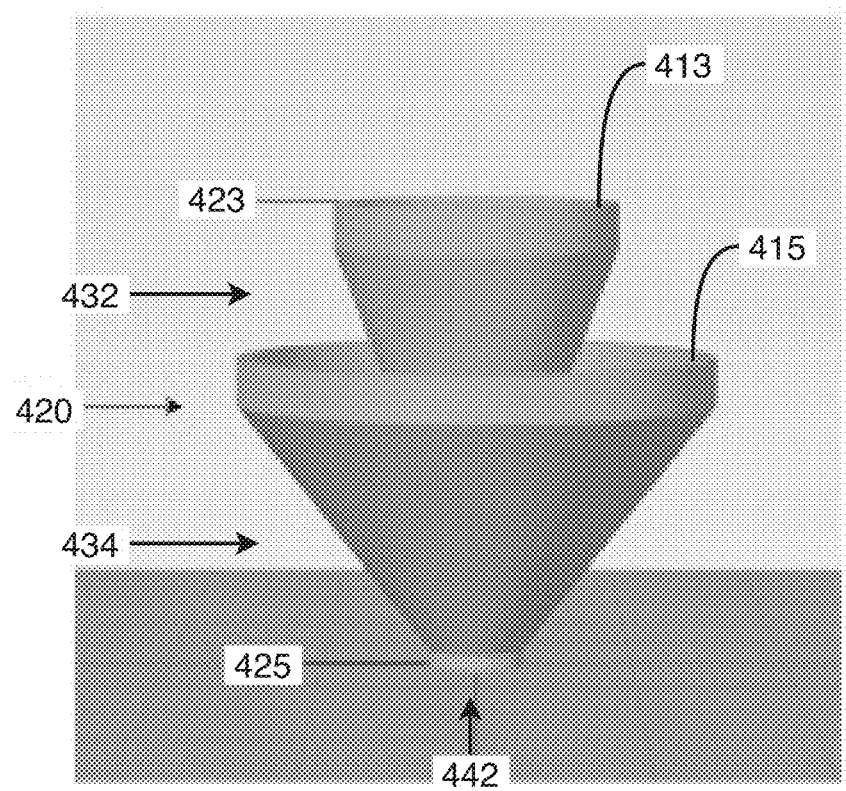
FIG. 6 is a side view of a heating head of a fused deposition modeling printer according to an embodiment.
Figure 7:
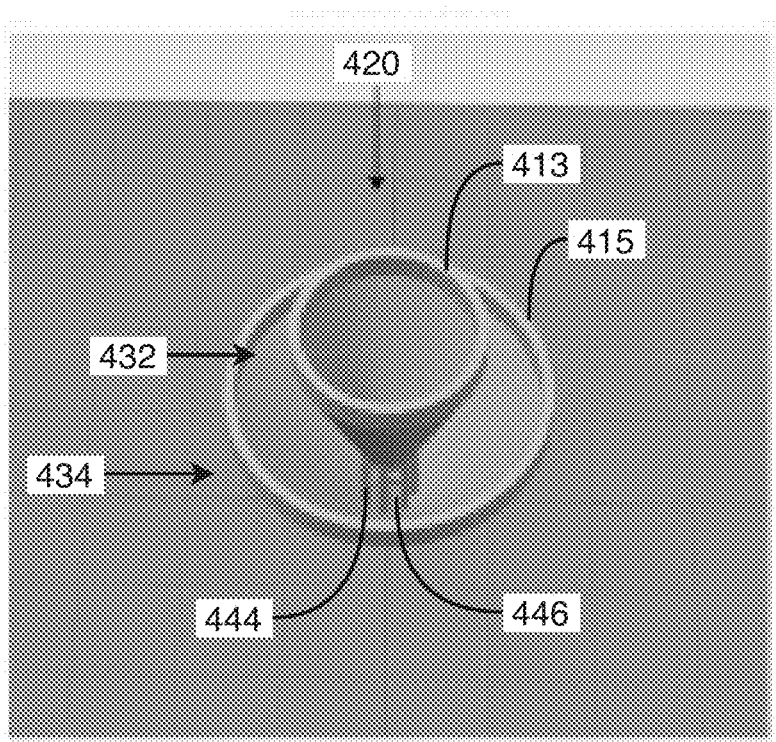
FIG. 7 is an elevation view of the heating head of FIG. 6.
Figure 8:
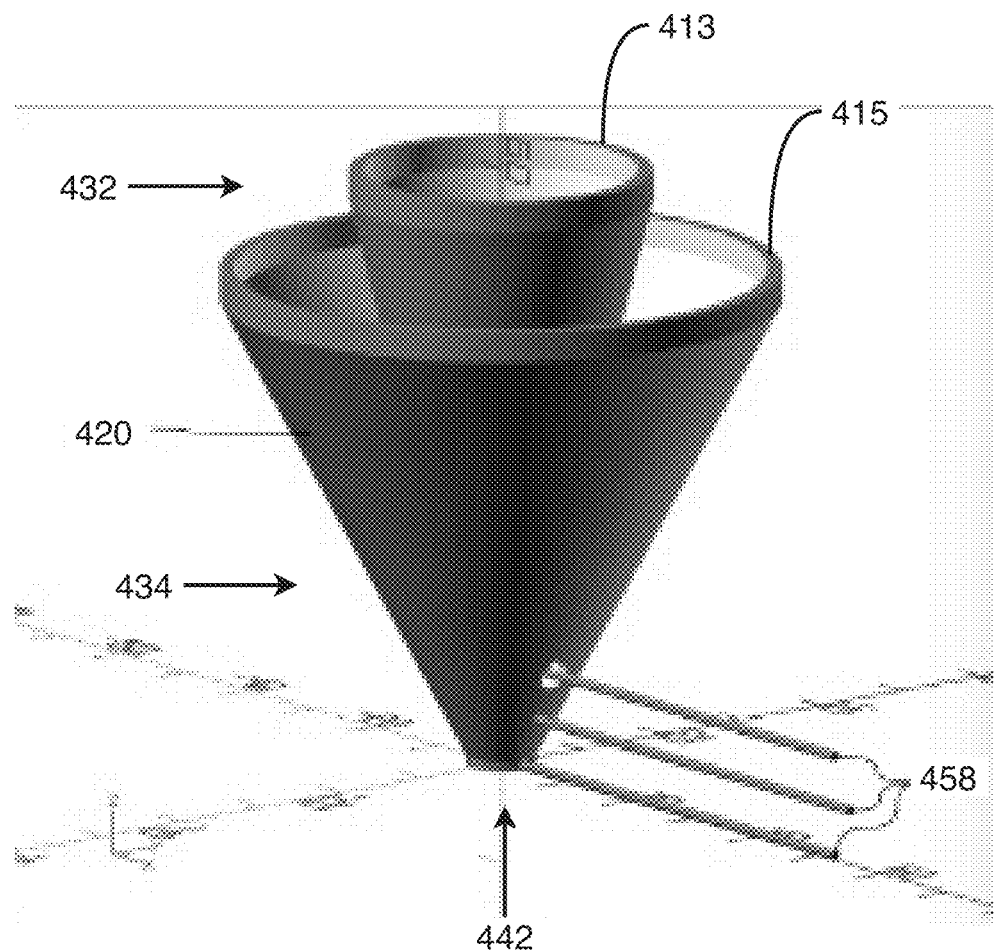
FIG. 8 is an elevation view of the heating head of FIGS. 6 and 7 with sensing wires.
Figure 9:
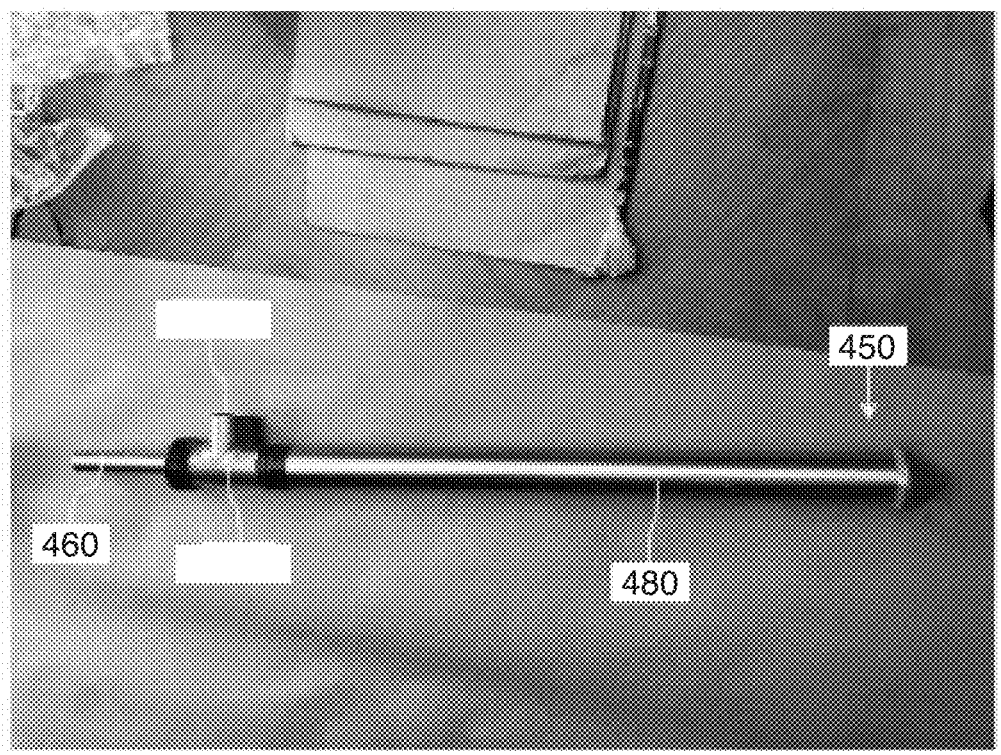
FIG. 9 is a picture of a tube adapted to operate in relation to the heating head of FIGS. 6 to 8 comprising an inner tube and an outer tube.

Referring particularly to FIGS. 6 to 8, the heating head 420 is made of, or at least comprises, an electrical and thermally conductive material, e.g., stainless steel or for very high-temperature platinum. The heating head 420 is adapted to perform a plurality of functions typically performed by separated components in known fused deposition modeling printers. The heating head 420 operates as a nozzle for depositing material and as a heating element for changing the phase of the material from a solid-state into a liquid state. The heating head 420 has female inner fitting 413 about its top edge 423; the top edge 423 is characterized by an associated perimeter, a corresponding circumference and a corresponding flow area. The female inner fitting 413 is adapted for connecting the inner tube 460. The female inner fitting 413 operates as a cylindrical contact face with the inner tube 460.

The heating head 420 is adapted to lead and pour the material to the heating head 420 from its bottom edge 425; the bottom edge 425 is characterized by an associated perimeter, a corresponding circumference and a corresponding flow area. The interface of the inner tube 460 with the heating head 420 further operates as an electrical connector, aka electrical contact, used to polarize the inner fitting 413. The heating head 420 has female outer fitting 415 for connecting the outer tube 480; the outer tube 480 adapted to hold air used as power communication medium toward molten material contained in the heating head 420. The interface of the outer tube 480 with the heating head 420 further operates as an electrical connector, aka electrical contact, used to polarize the outer fitting 415.

The inner tube 460 and the outer tube 480 are joined with the heating head 420 using a pressure conical fitting, or by friction welding.

The heating head 420 comprises a top funnel 432 with the inner fitting 413 at one extremity, and a bottom funnel 434 with the outer fitting 415 at one extremity and connecting to the periphery of the inner funnel 432 below the inner fitting 413. The bottom funnel 434 ends, or in this case the bottom portion of the heating head 420, at its bottom (small) extremity with an aperture 442 operating as a delivery nozzle for material deposition, aka melted material. A junction wall joins 444 and at least partially divides the top funnel 432 to the bottom funnel 434. Thus, the interior space in the top funnel 432 is at least partially concealed from the exterior space; a space enclosed by the bottom funnel 434.

According to an embodiment, the junction wall 444 features slits 446 that are sized to obstruct the flow of molten material from within the enclosure defined by the junction wall 444 toward to bottom funnel 434, wherein the outward flow is prevented by the viscosity of the molten material, but wherein the size of the slits 446 allows air movement to be directly coupled to the molten enclosed in the area delimited by the junction wall 444. Thus, the slits 446 provide openings through which fluid communication is provided between the interior space and the exterior of the top funnel 432 above the connection of the top funnel 432 with the bottom funnel 434.

In another realization of the heating head 420, no slits are present when with a realization where the influence of air pressure on the molten material is unnecessary and/or when structural and thermal characteristics for the heating head 420 are the outmost important characteristics to obtain and/or when the presence of slits would work against these desired characteristics for the heating head 420 or the desired operating conditions.

Thermal characteristics of the heating head 420 depend on the material(s) composing the heating head 420 and on design parameters, e.g., diameter, thickness, length, etc., of the heating head 420 since the crucible heats based on electricity traveling between the powered (polarized) inner fitting 413 and the powered (polarized) outer fitting 415.

In the depicted realization, the heating head 420 is designed in such a manner as the portion with the highest electrical resistance, i.e., the most important voltage drop/power output, is near the portion operating as a delivery nozzle, near the aperture 442. That characteristic is due to the electrical resistance increasing along with a decrease of the diameter, in other words, the bigger the circular diameter of the funnel/cone, the smaller the electrical resistance. Further, the higher the electrical resistance, the higher the heat generated and thus the temperature of the corresponding surface or portion. So, it results that, with the depicted heating head 420, most heat is generated near the bottom, and the portion connecting both funnels, namely the junction wall 444, has the greatest resistance, heats most where the most needed.

Practically, the resistance profile of the heating head 420, thus the heating profile of the heating head 420, can be adjusted by varying sizes and thicknesses to generate increase or decrease electrical resistance where it is needed. Typically, for 240V power found in Europe and North America, the total resistance will be around 1 ohm for large powerful heating heads, and around 50 ohms for smaller, less powerful heating heads.

According to realizations, the heating head 420 is made of stainless steel or of platinum, with the platinum heating head 420 featuring higher electric resistivity, thus heating to higher temperatures. However, tubes 460 and 480 are made of platinum on contacting sections to resist these high temperatures. Above, the materials of the tubes 460 and 480 may be modified through for example sectional tubes joined together as the temperature decrease. For example, a stainless-steel tube portion may be joined to a platinum tube portion farther from the heating head 420, and a copper tube portion may be joined even farther.

The tubes 460 and 480 are connected to a power source (see FIG. 2) able to provide high current/low voltage/high power necessary for the current circulating in the heating head 420 to heat to the temperature needed. According to realizations, the reached temperature is up to about two thousand (~2000) degrees Celsius for a heating head 420 made of platinum and about nine hundred (~900) degrees Celsius for a heating head 420 made of stainless steel. Since the heat/temperature drops with the diameter, as explained above, only the small exit diameter will reach that peak temperature. Further, the heating head 420 is designed with diameters for the fittings 413, 415 that are big enough for the temperature at the fittings to be low enough for refractory material (e.g., plaster/alumina) to be used to hold the tubes 460, 480 to the heating head 420.

Since the electric power source is of a known voltage, a current sensor can be used to measure the resistivity of the heating head 420 which doubles as a temperature measurement since the electrical resistance of the heating head 420 changes with temperature. Accordingly, the electrical power controller and the flow sensor define a feedback temperature control system.

Referring to FIG. 8, a contemplated solution to measure the temperature of the heating head 420 comprises a Kelvin sensing (see reference https://en.wikipedia.org/wiki/Four-terminal_sensing) using a plurality of wires 458 contacting the heating head 420 at one extremity and plugged in a sensor (not shown) at the other extremity to sense changes in electrical characteristics of the heating head 420 as the temperature of the crucible changes, and thus to deduct the current temperature of the heating head 420. As above, a signal is transmitted to the electrical power controller 624 (FIG. 5) to perform live control of the temperature of the heating head 420.

According to the depicted realization, the outer tube 480 has a small hole that allows the passage from the outside of a sensor wire ending about the nozzle output between the two funnels 432, 434. Accordingly, an optical sensor or a pyrometer, and in case of low-temperature operation, a thermocouple or thermistor can sense the nozzle output, and thus, directly measure its temperature.

It is also contemplated through the present document to have a heating head made of or comprising a mix/composite of ceramic material and metallic material that defines a cermet layer 122 with a shape that is close to the shape of the heating head 420, or comprising at least one inner funnel-shaped conduit with two electrical contact areas. The locations of the electrical contact areas, for example, top and bottom (e.g. heating head 120), or top inner ring and top outer ring (e.g. heating head 420) depend on the nature and relative configuration of the components of the corresponding head assembly.

In these contemplated realizations, the heating head has two electrical contact areas distant from each other and connected to each other through a cermet layer 122 covering the wall of the funnel-shaped conduit. The locations of the electrical contact areas and the surfaces free of the cermet layer 122 are selected to provide both contact areas for current to power up the heating head; relatively large electrical contact areas for low-temperature electrical contacts; and surfaces free of the cermet layer 122 limiting current path, providing support and having other structural advantages.

Referring now to FIGS. 10 to 16, according to other embodiments, a heating head 500 is adapted to feature two or more electric contacts wherein the electrical contacts cooperate with tightening rings operating as electric connections powering the heating head 500.

Figure 15:
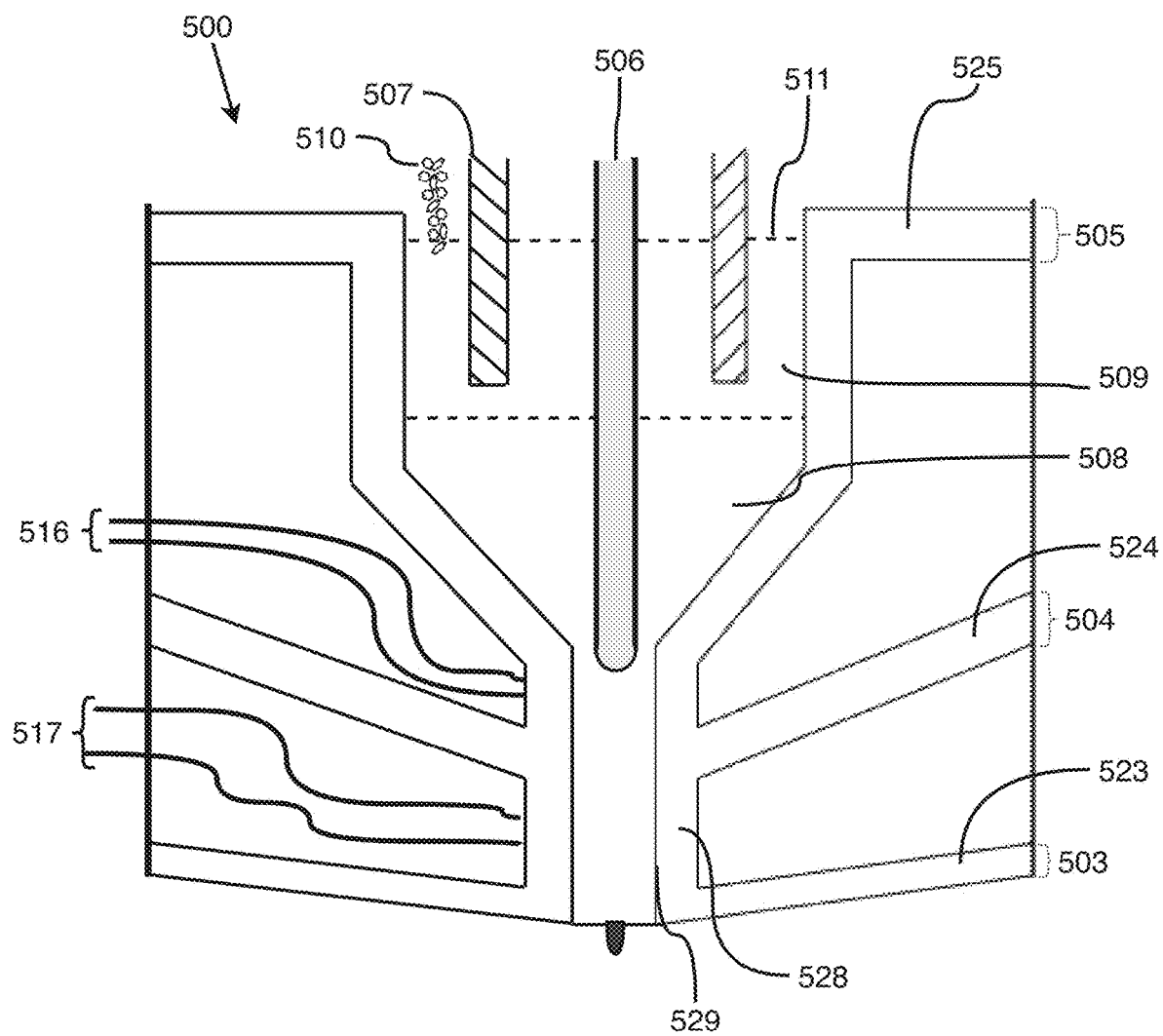
FIG. 15 is a schematic of a partial sectional side view of components of a head assembly of a fused depiction modeling printer in accordance with another embodiment.

Referring particularly to FIG. 15, the heating head 500 comprises a series of disk flanges 523, 524 and 525 extending outwardly from the conduit portion 528 of the heating head and having preferably circumference surfaces 503, 504 and 505 operating as the electrical contacts for connection with the of the tightening rings 501 or 502 (see FIGS. 11 and 12).

According to realizations, the disk flanges 523, 524 and 525 may either be made of electrically conductive material, aka covering the entire thickness of the part or alternatively comprises a layer of electrically conductive material about the surface or inside the disk flanges 523, 524 and 525. It applies similarly to the conduit portion 528 of the heating head 500, wherein the conduit surface 529, aka interior surface of the conduit portion 528, should feature electrically conductive material on its surface for optimal heating of the material 510.

Referring particularly to FIGS. 10 to 14, according to realizations the tightening rings are single piece tightening rings 501 or multi-piece, for example, two pieces, tightening rings 502, wherein the extremity of the tightening rings 501, 502 are either attached to each other (for example tightening rings 501) or attached to each other (for example tightening rings 502) to form a closed ring or ring assembly contacting and inwardly pressing tightly the complete circumference surfaces 503, 504, 505 of the disk flanges 523, 524 for optimal electrical contact therebetween.

According to realizations, the tightening rings 501 or 502 are cooled down via a flow of cooling fluid. According to realizations, the tightening rings 501, 502 comprise either one or more recesses, for example, recess 515, limited by the combination of the structure 514 of the tightening ring 501, 502 or alternatively one or more conduits, for examples the two conduits 513, totally enclosed in the structure 512 of the tightening rings 501, 502 and isolated from the heating head 500. According to realizations, and particularly to the materials of the tightening rings 501, 502 and the temperature reached by the tightening rings 501, 502, the cooling fluid may be for instance air, water, oil, or another heat exchange fluid that may be circulated in the examples conduits 513 or recess 515.

When cooling fluid is used, the tightening rings 501, 502 features inlet(s) 532 and outlet(s) 534 connectable to a fluid exchanging source (not depicted).

It should further be noted that the tightening rings 501, 502 may further provide a combined function of support when connected to a support structure, wherein the tightening rings 501, 502 provides aid in alignment and/or displacement of the heating head 500.

It should further be noted that the design of the heating head 500 allows the use of multiple tightening rings 501, 502 operating as multiple electrical connectors, and thus additional control of the circulation of the current in the heating head 500.

Referring additionally to FIG. 15, sensors 516 and 517, and more particularly resistive sensors 516 and 517 may be connected to the heating head 500 to measure the temperature of the heating head 500 and to adjust, in real-time or almost in real-time, the power transmitted to the tightening rings 501, 502 to monitor and control the operation of the heating head 500.

According to realizations, the heating head 500 may have a longer conduit featuring a greater number of temperature-controlled sections, wherein the temperature in each of the sections may be controlled by controlling the power transmitted to the tightening rings mounted to the disk flanges that are boundary to the temperature-controlled section, for example, disk flanges 524 an 525 for the top section of the conduit on FIG. 15.

Accordingly, sensors, for example, sensors 516 and 517, may be located at different locations along the conduit 508 to monitor and control finely each of the temperature-controlled sections of the heating head 500.

According to realizations, the heating head 500 may be free of material between the disk flanges 523, 524 and 525. According to alternative realizations, the heating head 500 may feature electrically insulating material between two neighbor disk flanges, for example filling the space therebetween or vertical radial membranes. When needed, the additional material may provide extra robustness to the heating head 500. Other reasons, including other structural reasons and fabrication reasons, are also contemplated therethrough.

Figure 16:
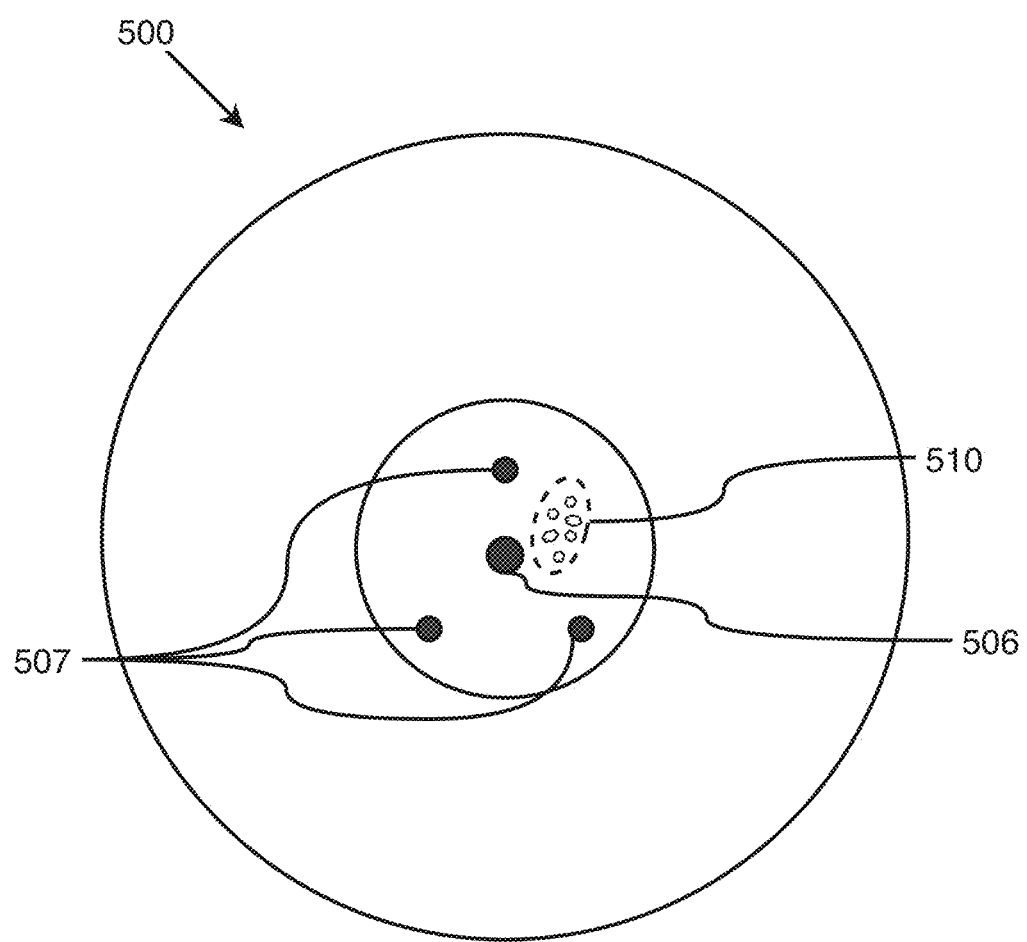
FIG. 16 is schematic top view of the components of a head assembly depicted on FIG. 15.

Referring now particularly to FIG. 15 and additionally to FIG. 16, according to a realization a needle valve 506 of a suitable material is used, centered relative to the conduit 508, mounted from a support (not depicted) at its top, wherein the needle valve 506 provides aid for flow control by, for example, changing gas pressure and/or changing output temperature. The needle valve 506 is moveable up and down deeper in the melting or melted material 510. According to a realization, the needle valve 506 is cooled down at or about its support, above the level of the material 510.

According to a realization, electrodes 507 are partially immersed in the conduit 508, and more precisely in a portion wherein the material 510 is at least partially molten in a molten material 509. Use of the electrodes 507, in some cases in the presence of a suitable flux, for example, of cryolite in the case of alumina, allows electrolysis of oxides potentially present in the raw material in the heating head 500, wherein electrolysis at this state generates oxygen 511.

This realization has the advantages of solving the issues of the presence of oxides on the surface when the material consists in aluminum granules, while being able to operate at a working temperature of between about seven hundred (700) degrees Celsius and about one thousand (1000) degrees Celsius. Furthermore, contrary to large-scale aluminum production in which electrodes can weigh a ton or more, the present electrodes are a lot smaller, in the hundreds of grams range, and can be made of a suitable premium material.

It should be noted that this solution to the presence of oxides on the surface of aluminum becomes extremely interesting when applied to lunar or Martian regolith. Since the present crucibles can operate according to targets temperatures capable of melting these raw materials, for example about one thousand and six hundred (1600) degrees Celsius, the present solution of electrolysis can be applied to these molten materials (https://isru.nasa.gov/Molten_Regolith_Electrolysis.html) to produce oxygen, thus useful on the Moon or on Mars, and metal. The metal can be left in the output to modify the properties of the 3D printed object, in varying degrees of proportions, or potentially extracted.

It should further be noted that the controlled use of electrodes by disconnecting them from the heating head may allow, depending on the melted material, controlled use of the melted material as a medium for the passage of electricity. In these cases, it is possible to obtain a partial electrolysis of the material.

One particular case of the use of additional electrode(s) (for example an electrically powered needle valve 506) is when depositing highly viscous material. By forcing partial electrolysis of the melted material close to the exit of the heating head, the electrolysis of the material will increase flow of material while generating gas in it close to the exit to the heating head. The generated gas will remain enclosed in the material when deposited and thereby permanently modify the characteristics of the material among which an increase of the thermal insulation characteristics of the material. One example of the use of material having increased thermal insulation is for housing.

It should further be noted that, by controlling the thickness of the electrically conductive layer (aka electrically conductive trace or electrically conductive path since at least a portion may be distant from the surface), for example, cermet layer 122, along with the height of the conduit, the head assembly 110 or heating head 420 or 500 may be designed to have a gradient of temperature since thicker conductive layer providing a greater cross area for the electricity to pass through while a thinner layer providing a smaller cross area, thus more resistance, for the passage of the electricity, and thus generating more heat.

It should further be noted that the fabrication of the heating head according to a preferred method of fabrication involves deposition layer by layer of different powders which are pressed and/or sintered between each layer to generate in each layer areas of conductive material, for example, made of a mix of metal and ceramic, and potentially also of electrically insulating material, for example, made of ceramic only. The preferred fabrication method may also involve machining surfaces of the pieces, for example, space between disk flanges and the conduit surface 529.

By controlling the locations and dimensions (shape, thickness, etc.) of the traces of the conductive material in heating heads, heating heads of the variable distribution of temperatures may be designed, wherein the temperature at the electric contact may be set to be substantially lower than the temperature to be reached at the conduit surface and particularly about the nozzle end.

The shape of the contemplated realizations of heating heads is in part a question of the method of fabrication as of the selected material to be used to fabricate the heating head, the intended use of the heating head and particularly the material with which the heating head is intended to be used, the available manufacturing technologies, etc. These parameters limit or broaden the physical shape and configurations of heating heads and corresponding head assemblies contemplated through the present document.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A head assembly for a fused deposition modeling printer comprising:
   a heating head comprising:
      a top;
      a bottom;
      a conduit extending between the top and the bottom having a conduit surface for guiding a flow of material therein;
      an electrically conductive layer providing a resistance along the conduit surface for generating heat when electric current flows within the electrically conductive layer;
      a top electric connector connecting the electrically conductive layer at or near the top of the heating head;
      a bottom electric connector connecting the electrically conductive layer at or near the bottom of the heating head; and
      a biasing component pushing at least one of:
         the top electric connector toward electrically conductive layer; and
         the bottom electric connector toward the electrically conductive layer.

2. The head assembly of claim 1, wherein the electrically conductive layer is made of a combination of ceramic powder and of metallic powder.

3. The head assembly of claim 1, wherein the electrically conductive layer extends from the top to the bottom of the heating head.

4. The head assembly of claim 1, wherein the electrically conductive layer has a first thickness at a first circumference being at a first distance from the top and a second thickness at a second circumference being at a second distance farther from the top of the heating head than the first circumference.

5. The head assembly of claim 4, wherein temperature generated at the second circumference is greater than temperature generated at the first circumference.

6. The head assembly of claim 1, wherein the heating head comprises an electrically insulating layer distant from the conduit surface.

7. The head assembly of claim 1, wherein the electrically conductive layer extends over the conduit surface in its entirety.

8. The head assembly of claim 1, wherein one of the top electric connector and the bottom electric connector has a toric surface.

9. A head assembly for a fused deposition modeling printer comprising:
   a heating head comprising:
      a top;
      a bottom;
      a conduit extending between the top and the bottom having a conduit surface for guiding a flow of material therein;
      an electrically conductive layer providing a resistance along the conduit surface for generating heat when electric current flows within the electrically conductive layer;
      a plurality of flanges extending outwardly from the conduit each having a circumference surface; and
      an electrically conductive trace extending between a first one of the circumference surfaces at first one of the plurality of flanges and a second one of the circumference surfaces at second one of the plurality of flanges via a portion of the conduit surface; and electrically powered inwardly pressing tightening rings,
wherein the tightening rings are mounted to the first one and the second one of the circumference surfaces thereby defining an electric circuit therebetween via the conduit surface.

10. The head assembly of claim 9, wherein the flanges and the conduit have respectively a flange thickness and a conduit thickness, and wherein the electrically conductive trace extends over one of the flange thickness in its entirety and the conduit thickness in its entirety.

11. The head assembly of claim 9, wherein the flanges and the conduit have respectively a flange thickness and a conduit thickness, and wherein the electrically conductive trace extends over a portion of the conduit thickness extending from the conduit surface.

12. The head assembly of claim 9, wherein number of flanges is three (3) or more.

13. The head assembly of claim 9, wherein one of the tightening rings comprises one of a conduit and a recess providing passage for a cooling fluid.

14. The head assembly of claim 9, wherein the conduit comprises a section delimited by a pair of boundary flanges, wherein control of power transmitted over to the pair of boundary flanges determines heat generated by the conduit surface in the section.

15. The head assembly of claim 9, further comprising insulating material extending between two neighbor ones of the flanges.

* * * * *